(12) United States Patent
Raspe

(10) Patent No.: US 6,775,768 B1
(45) Date of Patent: *Aug. 10, 2004

(54) UNIVERSAL BOOT DISK

(75) Inventor: Edwin Raspe, Dublin (IE)

(73) Assignee: Gateway, Inc., Poway, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 967 days.

(21) Appl. No.: 08/807,096

(22) Filed: Feb. 27, 1997

(51) Int. Cl.[7] .............................. G06F 9/24; G06F 9/00
(52) U.S. Cl. ................................ 713/2; 713/1; 713/100
(58) Field of Search ................................ 395/652, 712, 395/651, 500, 830, 186; 364/280.2, 280, 976, 975.2, 280.9; 360/48; 380/4; 713/2–200; 710/10, 8, 23

(56) References Cited

U.S. PATENT DOCUMENTS

| 5,325,532 A | * | 6/1994 | Crosswy ..................... 395/700 |
| 5,652,868 A | * | 7/1997 | Williams .................... 395/500 |
| 5,694,600 A | * | 12/1997 | Khenson et al. ............ 395/652 |
| 5,696,975 A | * | 12/1997 | Moore et al. ............... 395/712 |
| 5,794,052 A | * | 8/1998 | Harding ...................... 395/712 |
| 5,867,730 A | * | 2/1999 | Leyda ......................... 395/830 |

OTHER PUBLICATIONS

Schmidt, F., "The SCSI Bus and IDE Interface: Protocols, Applications and Programming", Addison–Wesley Publishing Company, ISBN 0–201–42284–0, Cover page,Title page and Table of Contents, (1995).

* cited by examiner

*Primary Examiner*—Tim Vo
(74) *Attorney, Agent, or Firm*—Scott Charles Richardson; Bradley A. Forrest; Schwegman Lundberg Woessner and Kluth

(57) ABSTRACT

A universal boot disk for a computer is disclosed. In one embodiment of the invention, a computer system comprises a computer, a removable media storage device, and a boot media. The storage device operatively couples the computer. The boot media is removably inserted in the storage device, and has an executable program stored thereon to automatically detect one of a plurality of different compact-disc read-only-memory (CD-ROM) devices and to cause installation of a corresponding driver program. In one particular embodiment, the program comprises a language selection component, a keyboard selection component, as well as a CD-ROM auto-selection component.

18 Claims, 11 Drawing Sheets

--- [ GW2K UNIVERSAL BOOTDISK v1.98B. © 1996 GATEWAY 2000. ] ---

| | | | | |
|---|---|---|---|---|
| Press function key | F1 | to use the | ENGLISH | language. |
| Druk op functietoets | F2 | om de | NEDERLANDSE | taal te gebruiken. |
| Drück auf Funktionstaste | F3 | um de | DEUTSCHE | Sprache zu verwenden |
| Appuyez sur la touche de fonction | F4 | pour utiliser la langue | FRANÇAISE | |
| Tryck på funktionstangent | F5 | för att använda det | SVENSKA | språkrt. |

FIG 5

| | | | | | |
|---|---|---|---|---|---|
| F9 | Language OK, | Taal OK, | Langue OK, | Sprache OK, | |
| | Språk OK, | | | | |

33

| | | | | |
|---|---|---|---|---|
| F1 | OTHER language, | ANDERER taal, | AUTRE langue, | ANDERE Sprache, |
| | ANDRA språk | | | |

If you are not very familiar with computers, or you are using this boot disk for the first time, it is suggested that you read this information carefully, in order to understand the features and functions of this boot disk.

First a word about how to navigate through this information. When you press the cursor key  (aka ARROW DOWN) you will see that this text moves upwards, and vice versa by pressing the cursor key You have reached the end of the help information only when the following line appears:  END OF INFORMATION.

Scroll text  UP   and   DOWN      with the  CURSORKEYS ↑ and ↓ .

Press function key  F1  to CONTINUE   or   F10    to   RESET SETTING

FIG 7

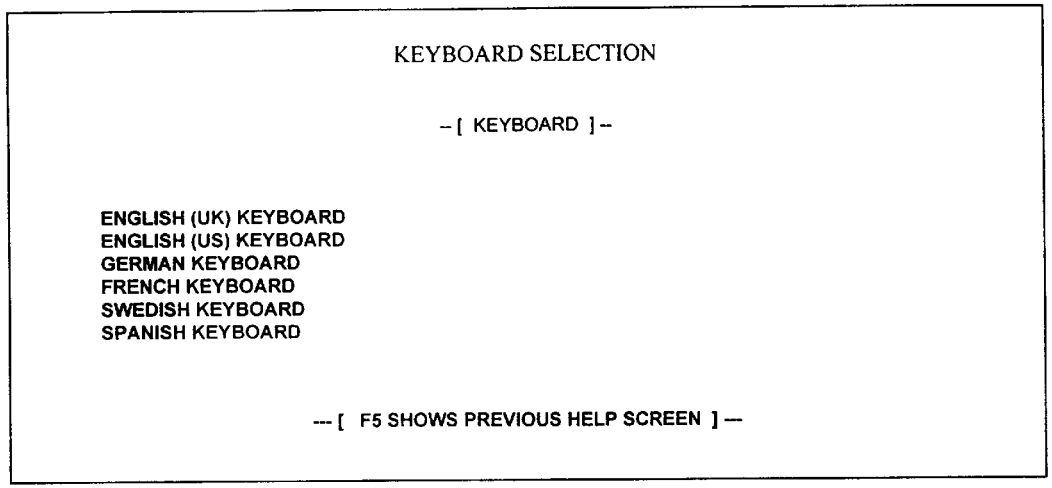
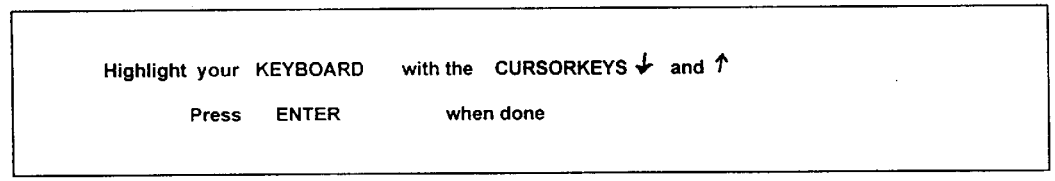
FIG 8

MAIN MENU

INSTALL CD ROM DRIVERS ON YOUR HARD DRIVE
INSTALL AN OPERATING SYSTEM ON YOUR HARDDRIVE
RESET YOUR BOOT DISK SETTINGS
VIEW YOUR BOOT DISK SETTINGS
HELP
EXIT PROGRAM. GO BACK TO DOS

Use the CURSORKEYS ↑ and ↓ to highlight your action.

Press ENTER when done.

FIG 9

OVERVIEW CURRENT BOOT DISK SETTINGS

The current language is:
ENGLISH

The current keyboard is:
ENGLISH (UK) KEYBOARD

The current CD-ROM drive is:
SOLO 2 SPEED CD-ROM EXTERNAL. (PORTABLES ONLY)

Available CD-ROM driveletters:
D:\

Press any key to return to the main menu

FIG 10

UNIVERSAL BOOT DISK

FIELD OF THE INVENTION

This invention relates generally to boot disks for computers, and more specifically to such boot disks that are universal.

BACKGROUND OF THE INVENTION

Since the invention of the computer, and especially since the invention of the MS-DOS-compatible personal computer, computers have grown increasingly flexible, and as a result, increasingly complex. A given type of computer may be used with over thirty different compact-disc read-only-memory (CD-ROM) drives, and must present information to users speaking over ten different languages. Furthermore, the computer may be used with any of a number of different types of keyboards as well.

This flexibility and resulting complexity makes configuration of computer systems a daunting task for computer manufacturers. The operating system typically installed on a computer—for example, MS-DOS, or Microsoft Windows—is usually generic, and is not tied to any particular CD-ROM, spoken language, or type of keyboard. Therefore, the manufacturers themselves must assist the end users in customizing the operating system so that it meets the particular configuration requirements of the users.

One solution to this predicament is the boot disk. The boot disk is usually a high-density three-and-a-half-inch floppy disk holding 1.4 megabytes of data. The boot disk customizes the operating system of the computer so that it recognizes the CD-ROM player that is shipped with the computer, presents information to the user in the correct language, and recognizes the keyboard used with the computer. In the case where the operating system did not come pre-installed with the computer, the boot disk also typically manages the installation of the operating system, ensuring that the operating system is installed per the user's configuration requirements.

However, the boot disks currently used are a nightmare for technical support personnel of computer manufacturers. One computer manufacturer estimates that for the number of different CD-ROM players and languages that must be supported, over fifty different boot disks are required (i.e., ten different CD-ROM players and five different languages). When rare keyboard combinations are also taken into account, the number of boot disks required rises to over seventy. Even not taking into account CD-ROM players no longer sold by this manufacturer, a staggering thirty different boot disks are required. This means that the support personnel must be equipped to handle each of thirty different boot disks.

Furthermore, the boot disk is typically written from a computer programmer's perspective. The boot disk usually does not inform the user what it is doing, and is also difficult to use by the novice computer user. For example, the user may have to know exactly the type of CD-ROM that has been installed in the computer—information which many times the user does not know. All of this means that the user is more likely to call technical support even if the boot disk is functioning correctly, to obtain assistance in stepping through the boot disk process.

Therefore, there is a need for a boot disk that is universal. The boot disk should be able to accommodate many different CD-ROM players, many different languages spoken by end users, and many different types of keyboards. Furthermore, there is a need for a boot disk that is easy to use and informative. The boot disk should be able to automatically detect the type of CD-ROM player that has been installed with the computer. The boot disk should also tell the user what it doing at each step during the boot disk process.

SUMMARY OF THE INVENTION

The present invention relates to a universal boot disk for a computer. In one embodiment of the invention, a computer system comprises a computer, a removable media storage device, and a boot media. The computer has at least a central-processing unit and a memory. The removable media storage device is operatively coupled to the computer. The boot media is removably insertable in the removable media storage device, and has an executable program stored thereon for automatically detecting one of a plurality of different compact-disc read-only-memory (CD-ROM) devices and causing installation of a corresponding driver program.

In another embodiment of the invention, a boot disk for a computer operatively coupled to a CD-ROM device of a particular type has an executable program stored thereon. The program comprises a language selection component, a keyboard selection component, and a CD-ROM auto-selection component. The language selection component queries a user of the computer for a desired language in which for the computer to convey user-readable information. The keyboard selection component queries the user for a type of keyboard with which the computer will be used. Finally, the CD-ROM auto-select component detects automatically the particular type of the CD-ROM device operatively coupled to the computer.

The boot disk of the present invention provides for a number of advantages. The boot disk is universal, in that it accommodates many different CD-ROM players, many different languages spoken by end users, and many different types of keyboards. The boot disk is easy to use and informative, in that the disk automatically detects the type of CD-ROM player installed with the computer, and its language and keyboard selection components ask the user in easy-to-understand terms the information it needs.

Other embodiments of the invention include a method for booting a computer comprising the steps of querying a user for a desired language in which for the computer to convey information, querying the user for a type of keyboard with which the computer will be used, and automatically detecting the particular type of the CD-ROM device operatively coupled to the computer. Still other and further aspects, embodiments and advantages of the present invention will become apparent in the following description and by reference to the accompanying drawings.

BRIEF DESCRIPTION OF THE DRAWINGS

FIG. 5 is a screen shot of a language selection component of a boot disk program according to one embodiment of the invention;

FIG. 6 is another screen shot of a language selection component of a boot disk program according to one embodiment of the invention;

FIG. 7 is yet another screen shot of a language selection component of a boot disk program according to one embodiment of the invention;

FIG. 8 is a screen shot of a keyboard selection component of a boot disk program according to one embodiment of the invention;

FIG. 9 is a screen shot of a main-menu phase of a boot disk program according to one embodiment of the invention; and, FIG. 10 is another screen shot of a main-menu phase of a boot disk program according to one embodiment of the invention.

DETAILED DESCRIPTION OF THE INVENTION

Hardware/System Overview of the Invention

Figure 1:
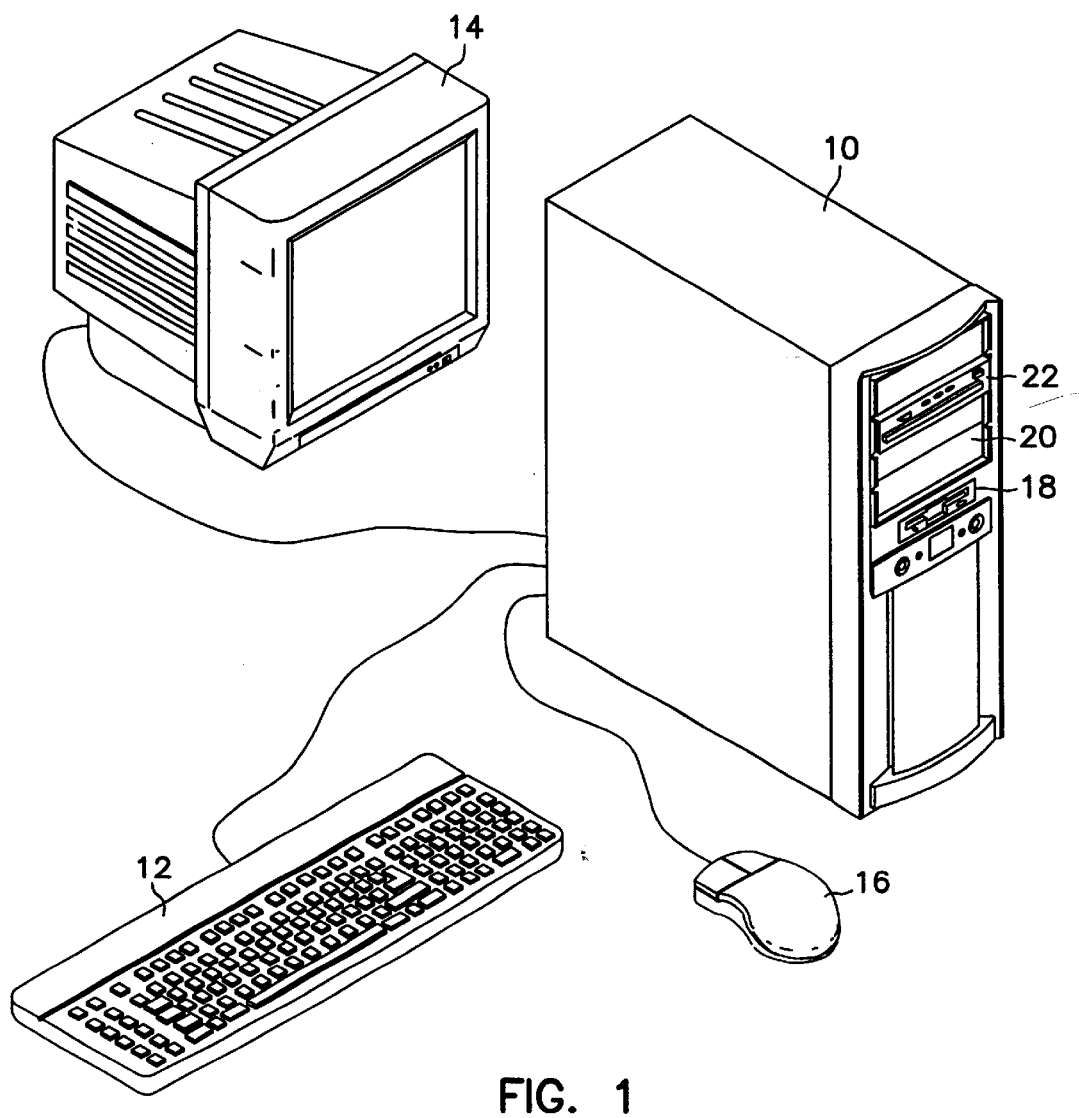
FIG. 1 is a diagram of a typical computer in conjunction with which the present invention may be used.

The present invention relates generally to a universal boot disk for a computer. A diagram of a typical computer in conjunction with which the present invention can be used is shown in FIG. 1. Computer 10 usually is operatively coupled to keyboard 12, display device 14 and pointing device 16. Computer 10 also includes removable media storage device 18, compact-disc read-only-memory (CD-ROM) device 20, and fixed media storage device 22. Computer 10 is configured such that if a removable media is inserted into device 18 at the time of start-up (i.e., when computer 10 is first turned on), computer 10 assumes that the media is a boot disk, and passes control thereof to the boot disk. Not shown is that computer 10 typically also includes a random-access memory (RAM) (in one embodiment, sixteen megabytes) and a central-processing unit (CPU) (in one embodiment, an Intel Pentium processor. As shown, computer 10 is a tower computer, such as a Gateway 2000 personal computer, although the invention is not so limited. For example, computer 10 could also be a laptop computer such as a Gateway 2000 Solo.

Computer 10 typically has an operating system running thereon that coordinates activity by other computer programs, especially in conjunction with keyboard 12, display device 14, pointing device 16; removable media storage device 18, fixed media stage device 20, and CD-ROM device 22. One such operating system is MS-DOS; another is Microsoft Windows 95. Keyboard 12 can be any of a number of different keyboards, including an English language (United States) keyboard, an English language (International) keyboard, and a German language keyboard, among others. Display device 14 can be any of a number of different devices, such as a computer monitor employing a cathode ray tube (CRT), or a liquid crystal display (LCD). Pointing device 16 as shown in FIG. 1 is a mouse, although the invention is not so limited. For example, pointing device 16 may also be a trackball, or a touch pad.

Removable media storage device 18 is typically plugged into a corresponding connector of computer 10, and in one embodiment is a floppy disk drive amenable to the insertion of high-density three-and-half-inch floppy disks holding 1.4 megabytes of information each. CD-ROM device 20 is also typically plugged into a corresponding connector of computer 10, and in one embodiment is a CD-ROM player, such as those manufactured by and available from NEC, Sony and Hitachi, but may also be a CD-ROM recorder and player, or other type of CD-ROM device, as well. Finally, fixed media storage device 22 is typically plugged into a corresponding connector of computer 10, and in one embodiment is a hard disk drive having 2.0 gigabytes of capacity, such as those manufactured by Connor, Western Digital, and Seagate.

Overview of the Boot Disk Program

The flowcharts of FIG. 2(a), FIG. 2(b), FIG. 2(c), FIG. 3, and FIG. 4 effectuate the order of flow for a boot disk program according to an embodiment of the invention. The screen shots of FIG. 5, FIG. 6, FIG. 7, FIG. 8, FIG. 9, and FIG. 10 are displays seen by the user on display device 14 at various stages of the boot disk program, as will be referenced hereafter. The boot disk program is stored on a boot disk (in one embodiment, a three-and-a-half inch floppy), for insertion into removable media storage device 18 when computer 10 is first started (i.e., turned on). The program in one embodiment is executable by the Intel Pentium processor of computer 10, as is well known by those of ordinary skill within the art.

Therefore, according to one embodiment of the invention, when the computer in which a boot disk of the invention is inserted into the removable media storage device is turned on, the program residing on the boot disk program is run. Referring first to FIG. 2(a), a flowchart of a start-up component of the boot disk program is shown. At step 24, the boot disk program determines whether all the flags are present. The boot disk program has flag files, keyboard.flg, language.flg, and cdrom.flg, located in the flags directory on the boot disk. If the boot disk has previously been run, each of these flag files will have been created. The keyboard.flg file indicates that a keyboard has been set for the computer, the language.flg file indicates that a language has been set, and the cdrom.flg file indicates that a CD-ROM driver has been set. If all the flags are not present, the boot disk program directs control to the set-up phase of the program at step 26; otherwise, the program directs control to the start main menu phase at step 28.

Boot Disk Program: The Set-Up Phase

Referring now to FIG. 2(b), a flowchart of one part of a set-up phase of a boot disk program according to one embodiment of the invention is shown. At step 30, the program determines whether the language.flg flag is present. If it is not, control is directed to step 32. Steps 32 and 34 are the language selection component of the program. In step 32, the user of the computer on which the boot disk program is running selects the language in which for the computer to convey user-readable information via pressing a function-key corresponding to the desired language. Languages supported by the boot disk program include English, German, Dutch (i.e., Benulex), French, and Swedish, although the invention is not so particularly limited.

The user is presented with a screen shot of available languages in step 32, as shown in FIG. 5. This screen shot is stored in the file lselect.all on the boot disk. When the user has selected the desired language by pressing the appropriate function key, the program verifies the selection, by asking the user to press another function key to confirm the selection. This is shown in the screen shot of FIG. 6, which is stored in the file langok.all from the boot disk (language-is-ok part 33 of FIG. 6) and the file langnok.all from the boot disk (language-is-not-ok part 31 of FIG. 6). If the user selects F1 (other language), the language selection screen of FIG. 5 is again shown to the user, and the user is invited to make another selection. If when the screen shot of FIG. 6 is displayed the user presses F9 to confirm the selection, control proceeds to step 34 of FIG. 2(*b*).

At step 34, the boot disk program writes the flag language.flg, and loads a file language.xxx from the boot disk containing all the individual phrases associated with that language for use with the rest of the boot disk program's display screens. (Note that the suffix .xxx as used throughout refers to a file in a specific language; thus, for example, language.eng is the file language in English.) Step 34 also loads and displays the file welcome.xxx from the boot disk. This file describes exactly how the set-up process works, and what will be asked from the user. The user is able to browse through this file using the cursor keys, which is also explained in the file. A representative screen shot of this file is shown in FIG. 7. Throughout the entire set-up phase, whenever an information file is displayed (such as the file welcome.xxx), the user can use four different keys: F1 to continue, F10 to reset the settings, and arrow up and down to browse through the information. Pressing F10 at any of these displays erases all the flags in the \flags directory, and reverts control of the program back to step 30.

Once the welcome screen is shown (i.e., FIG. 7), and the user presses F1 to continue, control of the boot disk program continues to step 36 from step 34. In addition, if the language flag was present at step 30, control also automatically continues to step 36. At step 36, the program determines whether the keyboard.flg flag is present. If it is not, control is directed to step 38. Steps 38 and 40 are the keyboard selection component of the boot disk program. In step 38, the user of the computer on which the boot disk program is running selects the keyboard with which the computer is or will be used.

The user is presented with a screen shot of available keyboards in step 38, as shown in FIG. 8. This screen shot is stored in the file keyboard.xxx from the boot disk. The file keybdata.xxx, also on the boot disk, contains the names of the keyboards that can be selected, and which are shown in FIG. 8. An overview of the keyboards available in one embodiment of the invention is shown in the table below:

| KEYBOARD CHARACTERISTICS | |
| --- | --- |
| KEYBOARD | CHARACTERISTICS |
| English (U.K.) | QWERTY, pound sign above the 3-key |
| English (U.S.) | QWERTY, hash (#) sign above the 3-key |
| German | QWERTZ |
| French | AZERTY |
| Swedish | QWERTY, special Swedish characters visible |

The boot disk program does not immediately set the keyboard. Rather, when a user chooses to exit to DOS in the main menu phase (as will be discussed hereinafter), the appropriate DOS keyb command is given. There is a keyb DOS command (i.e., file) for each keyboard listed in keybdata.xxx, on the boot disk. The keyb command cannot be immediately set, because when it is in memory DOS cannot install from the system compact disc. After the user selects the appropriate keyboard with the arrow keys and presses enter, control proceeds to step 40 of FIG. 2(*b*).

Figure 2:
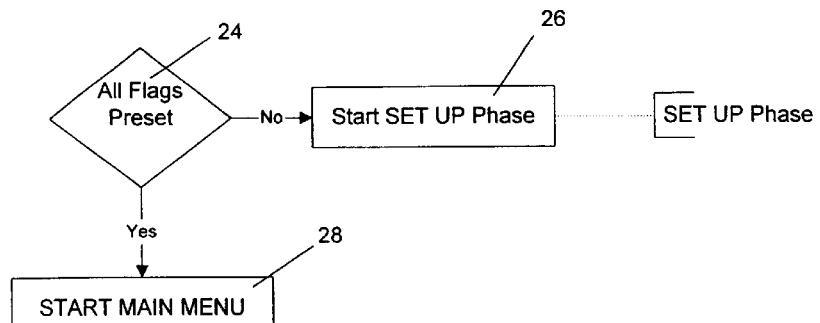
FIG. 2(a) is a flowchart of a start-up component of a boot disk program according to one embodiment of the invention.
FIG. 2(b) is a flowchart of part of a set-up phase of a boot disk program according to one embodiment of the invention.
FIG. 2(c) is a flowchart of another part of a set-up phase of a boot disk program according to one embodiment of the invention.
Figure 2:
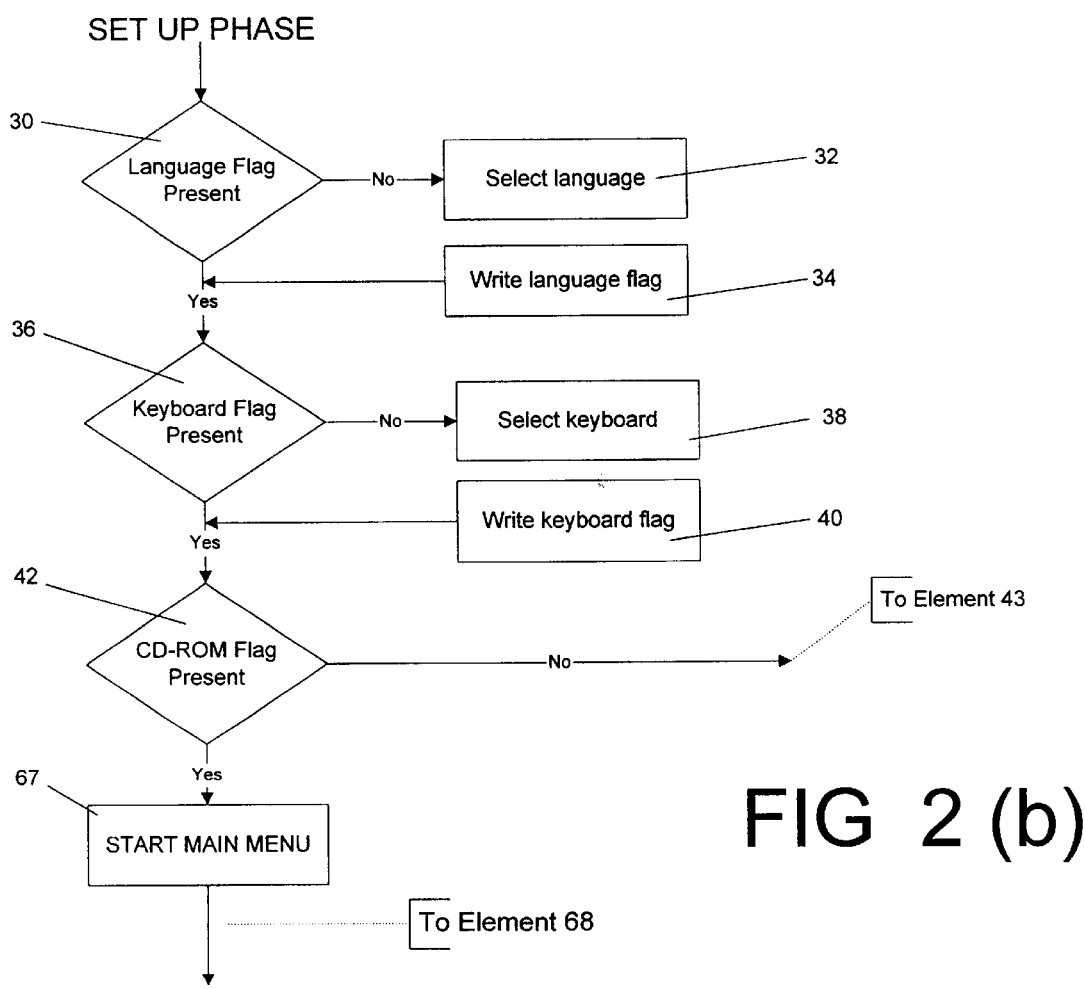
Figure 2C:
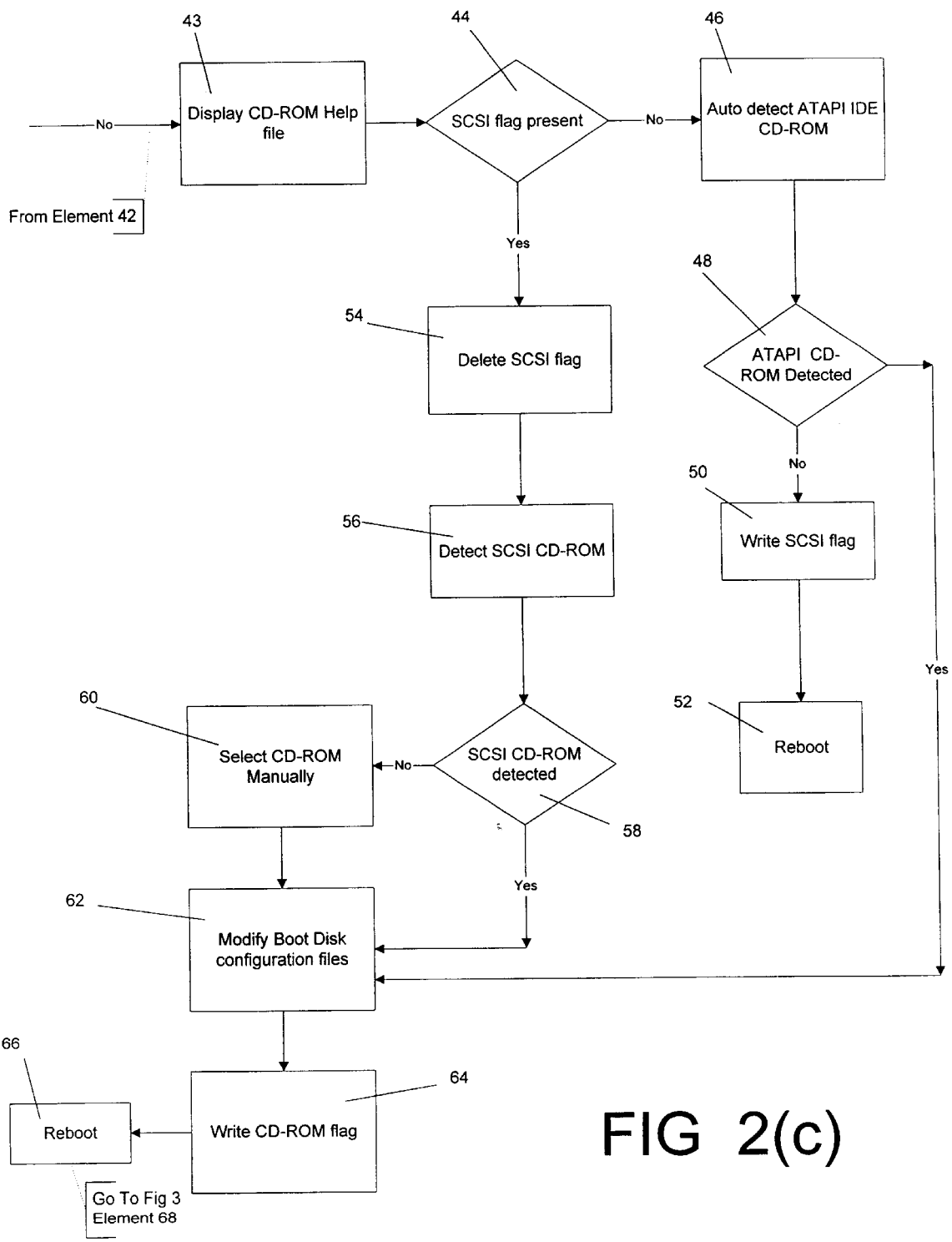

At step 40, the boot disk program writes the flag keyboard.flg. Control of the boot disk program continues to step 42 from step 40. In addition, if the keyboard flag was present at step 36, control also automatically continues to step 42. At step 42, the boot disk program determines whether the cdrom.flg flag is present. If it is not, control is directed to step 43, which is shown in FIG. 2(*c*). FIG. 2(*c*) is a flowchart of another part of the set-up phase. Steps 43, 44, 46, 48, 50, 52, 54, 56, 58, 60, 62, 64, and 66 are the CD-ROM auto-selection component of the boot disk program to detect automatically the particular type of the CD-ROM device operatively coupled to the computer. In step 43, the program loads and displays the file cdromdet.xxx, a help file, from the boot disk.

The boot disk program in one embodiment of the invention is compatible as per the following table:

| UNIVERSAL BOOT DISK vs. CD-ROM DEVICE COMPATIBILITY | | |
| --- | --- | --- |
| CD-ROM | COMPATIBLE | AUTO-DETECTABLE |
| Mitsumi 2 speed | No | No |
| Sony 2 speed | No | No |
| NEC 2 speed | Yes | Yes |
| Mitsumi 4 speed | Yes | Yes |
| Sanyo 4 speed | Yes | Yes |
| Sanyo 4 speed 3 deck | Yes | Yes |
| Sanyo 6 speed | Yes | Yes |
| Wearnes 8 speed | Yes | Yes |
| Toshiba 8 speed | Yes | Yes |
| Toshiba 4 speed SCSI | Yes | Yes |
| Gateway Solo CD-ROM external | Yes | Yes |
| Gateway Solo CD-ROM internal | Yes | No |
| No CD-ROM | Yes | No |
| No Gateway-supported CD-ROM | Yes | No |

In step 44, the boot disk program determines whether the flag scsi.flg file is present, which like the other flags, is located in the \flags directory on the boot disk. The flag scsi.flg is used to determine whether a SCSI or an IDE CD-ROM device should first be detected. As is known to those of ordinary skill within the art, CD-ROM devices are typically either SCSI or IDE devices. This flag is initially not present, but is written later should an IDE device not be found. If the flag is not present, control proceeds to step 46.

In step 46, the program detects automatically the ATAPI IDE type of CD-ROM device. This is accomplished by scanning the IDE ports of the computer (i.e., computer 10 of FIG. 1) for the existence of an ATAPI compatible IDE CD-ROM device. In step 48, if the boot disk program does not detect an IDE CD-ROM device, control proceeds to step 50, in which the flag scsi.flg is written (and, in one embodiment, aspi8dos.sys is added to the boot disk's config.sys file; aspi8dos.sys translates SCSI commands to DOS, as understood by those skilled in the art), and then to step 52, in which the system is rebooted. This means that the computer starts running the boot disk program again at step 24 of FIG. 2(*a*), which directs control to step 26 since all the flags are still not present (i.e., the cdrom.flg is not present). Step 26 of FIG. 2(*a*) then directs control to step 30. At step 30, because the language.flg flag is now present, control proceeds to step 36. At step 36, because the keyboard.flg flag is now present, control proceeds to step 42. At step 42, the cdrom.flg flag is not present, therefore control proceeds to step 43, and then to step 44. At step 44, the scsi.flg flag is now present, therefore control proceeds to step 54.

At step 54, the boot disk program deletes the flag scsi.flg, and control proceeds to step 56. In step 56, the program detects automatically the SCSI type of CD-ROM device. This is accomplished by scanning the SCSI ports of the computer (i.e., computer 10 of FIG. 1) for the existence of a SCSI CD-ROM device. In step 58, if the boot disk program does not detect an IDE CD-ROM device, control proceeds to step 60, in which step the user is able to select the CD-ROM device manually. This is accomplished by the loading and displaying of the file cdromhlp.xxx, a help file, from the boot disk, and the file cdrom.all, which contains the names of all the CD-ROM devices available. There are two lists from which the user can select a CD-ROM device. The first is a shortened list that contains only those CD-ROM devices that should have been detected but were not. The second is an extended list that contains all possible configurations of CD-ROM devices.

Whether the user selected the CD-ROM device manually in step 60, or a SCSI CD-ROM device was detected automatically in step 58, or an ATAPI IDE CD-ROM device was detected automatically in step 48, control proceeds next to step 62. At step 62, the boot disk program modifies the boot disk configuration files as to the particular CD-ROM device found or selected. The program loads the file cdrom.all from the boot disk to obtain the information necessary for modification of the configuration files. This file contains the identification strings for each CD-ROM device that the boot disk is capable of configuring, and matches these strings to the appropriate cdrom.dat file (the driver file), and the forbid.1 and forbid.2 files, also found on the boot disk, for each CD-ROM device. These strings are the same identification strings that are returned when running the MS-DOS utility program atapi3.exe program for a particular CD-ROM device.

Still referring to step 62, the boot disk program loads the appropriate cdrom.dat file for the CD-ROM device selected or found from the boot disk, as referenced within the cdrom.all file. The program alters the boot disk's DOS configuration files, by loading the corresponding forbid.1 and forbid.2 files for the CD-ROM device selected or found from the boot disk, which contain forbidden (sub)strings for the config.2 and autoexec.2 files, respectively. Any entries found in config.2 that match those found in forbid.1 are deleted, and any entries found in autoexec.2 that match those found in forbid.2 are also deleted. Then, the lines in the cdrom.dat file are added to both of config.2 and autoexec.2. Note that config.2 and autoexec.2 correspond to config.sys and autoexec.bat, but cannot be named as such to prevent conflicts with the boot disks's own config.sys and autoexec.bat files.

The following table lists known CD-ROM identification strings, as obtained by running the MS-DOS utility program atapi3.exe program:

| OVERVIEW OF KNOWN ID STRINGS AND USED SUBSTRINGS | | |
|---|---|---|
| CD-ROM | ID-STRING | SUBSTRING |
| NEC 2 × IDE | EN C DCR-MOD 1REV2.06 | same |
| MITSUMI 4 × IDE | XF00D1 E | XF00D1 E |
| | FX400 !B | FX400 |
| SANYO 4 × IDE | CD-ROM CDR_SIG | same |
| SANYO 6 × IDE | CD-ROM CDR_S16 | same |
| SANYO 4 × 3d | CD-ROM CDR-C3G | same |
| WEARNES 8 × IDE | WEARNES CDD-120 | not checked |
| | WEARNES CDD-820 | WEARNES |
| | WEARNES CDD-820 Beta | CDD-820 |
| TOSHIBA 8 × IDE | TOSHIBA CD-ROM XM-5602 | same |

| -continued | | |
|---|---|---|
| OVERVIEW OF KNOWN ID STRINGS AND USED SUBSTRINGS | | |
| CD-ROM | ID-STRING | SUBSTRING |
| TOSHIBA 4 × SCSI | TOSHIBA CD-ROM XM-5401 | same |
| | TOSHIBA CD-ROM XM-5301 | |
| SOLO CD-ROM | UJDCD2720 | same |

Control proceeds next to step 64, which writes the flag cdrom.flg, and then to step 66. In step 66, the file reboot.xxx from the boot disk is displayed to explain the process to the user, and when the user confirms that he or she has read the information, the computer is rebooted. This means that the computer starts running the boot disk program again at step 24 of FIG. 2(a), which directs control to step 28 since all the flags are now present.

Boot Disk Program: The Main Menu Phase

Figure 3:
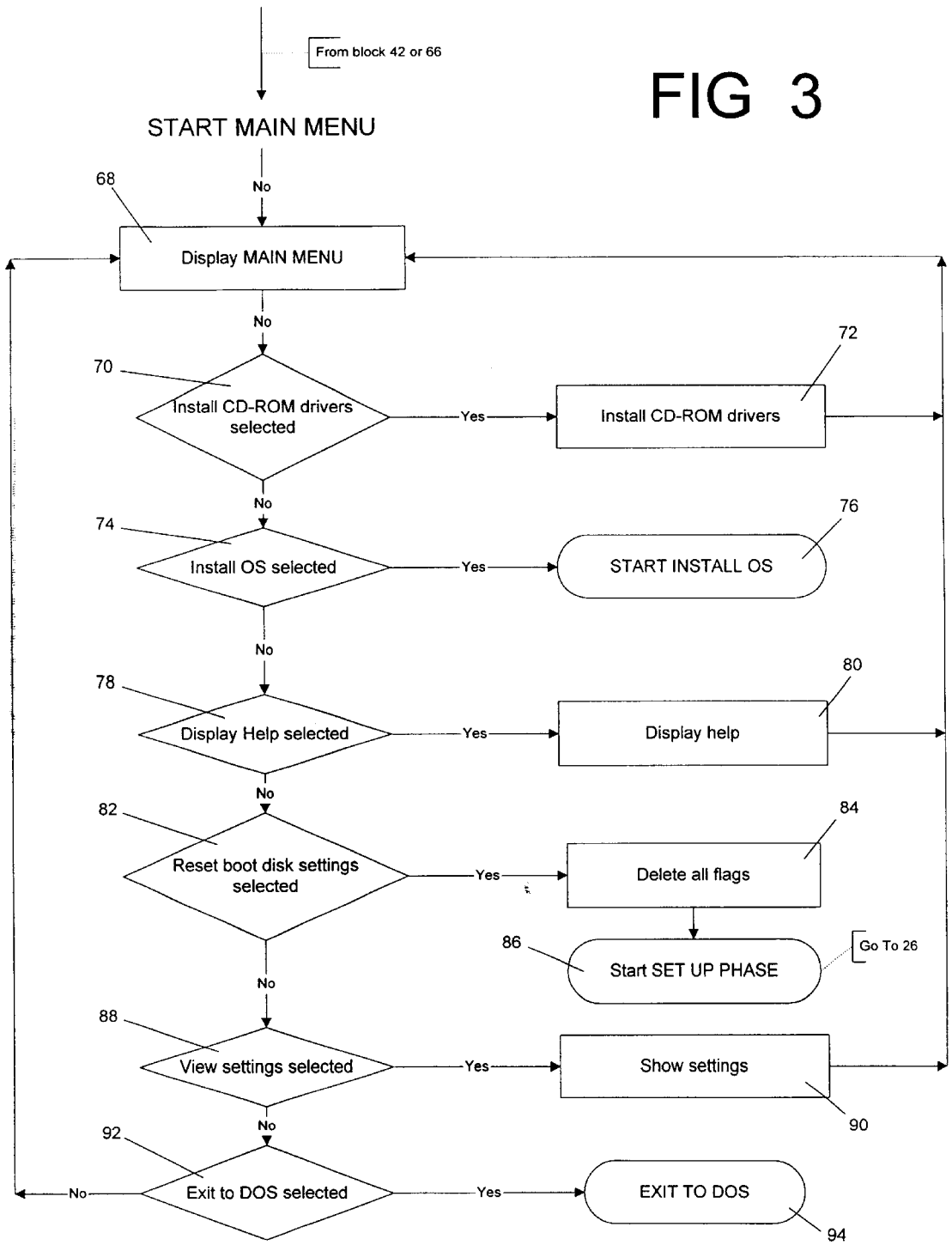
FIG. 3 is a flowchart of a main-menu phase of a boot disk program according to one embodiment of the invention.

Referring now to FIG. 3, a flowchart of a main menu phase of a boot disk program according to one embodiment of the invention is shown. Control proceeds to step 68 of FIG. 3 in two ways. First, if step 24 of FIG. 2(a) finds all the flags presents, control proceeds to step 28, and then control proceeds to step 68 of FIG. 3. Second, if step 42 of FIG. 2(b) finds that the CD-ROM flag is present, control proceeds to step 67, and then control proceeds to step. 68 of FIG. 3.

In step 68, the boot disk program displays the main menu. This is the loaded from the file menu.xxx, from the, boot disk, and is shown in the screen shot of FIG. 9. The user is able to select any of the options displayed on the main menu screen. After the main menu is displayed, control proceeds to step 70.

In step 70, the boot disk program determines whether the user of the computer has selected the "Install CD-ROM drivers" option. If the user has selected this option, control proceeds to step 72. Step 72 is the component of the boot disk program that installs a CD-ROM driver program corresponding to the particular type of the CD-ROM device onto a storage device of the computer. In step 72, the boot disk program copies the autoexec.2 and config.2 files from the boot disk to the fixed storage device of the computer as autoexec.bat and config.sys, respectively. The fixed storage device in one embodiment is a hard drive. Note that if the hard drive is not yet installed, then this option is not available to the user, since the installation of the CD-ROM driver assumes the presence of a hard disk drive. If there is a preexisting autoexec.bat or config.sys file, they are backed up before copying the files from the boot disk. Finally, in the case of Microsoft Windows for Workgroups, the system.ini file on the hard drive is also modified per any instructions in the cdrom.dat file for the CD-ROM device that had been previously selected or detected. When finished, control reverts back to step 68 (the main menu).

If the "Install CD-ROM drivers" option was not selected by the user at step 70, control proceeds to step 74, where the boot disk program determines whether the user has selected the "Install OS" option. If the user did, control proceeds to step 76. Step 76 is the component of the boot disk program that installs an operating system onto a storage device of the computer. This storage device in one embodiment is a hard disk drive.

Figure 4:
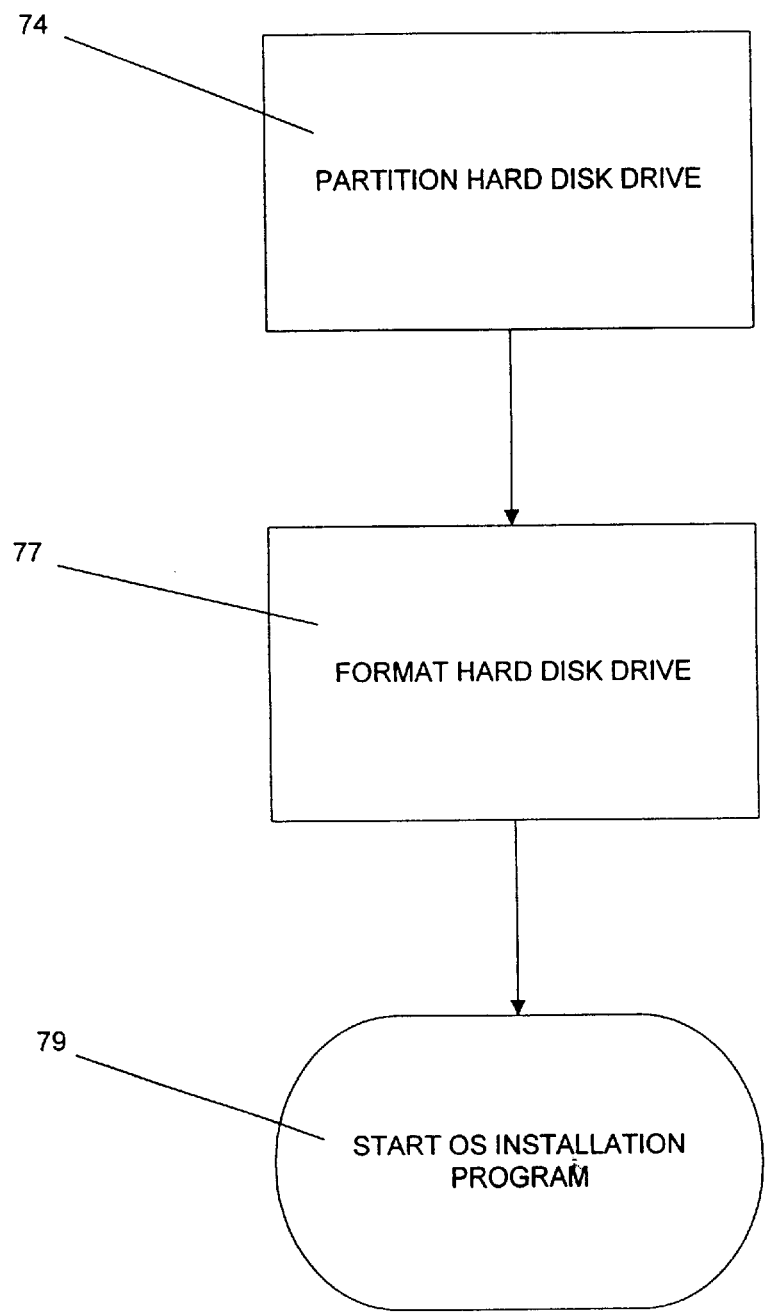
FIG. 4 is a flowchart of an operating system installation component of a boot disk program according to one embodiment of the invention.

One implementation of the operating system installation component is shown in FIG. 4. Referring now to FIG. 4, the operating system installation process begins at step 75. In step 75, the hard disk drive is partitioned; that is, the user indicates to the boot disk program the manner in which he or she desires to have the hard disk drive partitioned. Control then proceeds to step 77. In step 77, the hard disk drive is formatted (or reformatted), to the partition specification specified by the user in step 75. Both steps 75 and 77 are well known to those of ordinary skill within the art. Control then proceeds to step 79. In step 79, the operating system installation program for the desired operating system is initiated. This is typically accomplished from compact disc; for example, the Microsoft Windows 95 installation compact disc. The boot disk programs ends with giving control to this installation program.

Referring back to FIG. 3, if the "Install OS" option was not selected by the user at step 74, control proceeds to step 78, where the boot disk program determines whether the user has selected the "Display Help" option. If the user did, control proceeds to step 80. In step 80, the boot disk program displays a help file, mainhelp.xxx, from the boot disk. Once the user has reviewed the help file, control reverts back to step 68 (the main menu).

If the "Display Help" option was not selected by the user at step 78, control proceeds to step 82, where the boot disk program determines whether the user has selected the "Reset Boot Disk Settings" option. If the user did, control proceeds to step 84. Step 84 is the component of the boot disk program that resets the desired language selected by the user, resets the type of keyboard selected by the user, and resets the type of CD-ROM device automatically detected or selected. In step 84, the boot disk program first displays the file reset.xxx, which asks the user to confirm that he or she wishes to reset the settings. If the-user does confirm, step 84 resets all the flags cdrom.flg, keyboard.flg and language.flg. Control then proceeds to step 86. In step 86, the boot disk program starts the set-up phase again, reverting control back to step 24 of FIG. 2(a).

If the "Reset Boot Disk Settings" option was not selected by the user at step 82, control proceeds to step 88, where the boot disk program determines whether the user has selected the "View Settings" option. If the user did, control proceeds to step 90. In step 90, the current settings for the language and keyboard selected, as well as the CD-ROM device selected or detected, are shown. This is shown in the screen shot of FIG. 10. When the user presses an key on the keyboard, control reverts back to step 68 (the main menu).

If the "View Settings" option was not selected by the user at step 88, control proceeds to step 92, where the boot disk program determines whether the user has selected the "Exit to DOS" option. If the user did, control proceeds to step 94. In step 94, the boot disk program executes the appropriate keyb.com command for the keyboard selected, and the program exits to DOS. If at step 92 the user did not select the "Exit to DOS" option, control reverts back to step 68 (the main menu).

Boot Disk Configuration File Specifications

The following file specifications are used in one embodiment of the invention. They specify the file structure used for the various configuration files that have already been discussed.

cdrom.all file (in \config\all directory on boot disk)
Structure:
[number of different CD-ROM configurations (=n)]
$0<n<=30$
[
[configuration 1: number of different ID lines for CD-ROM configuration 1 (=m)]
$0<m<=10$
[ID line 1]
Length ID line >=1 AND <=30, preceded by PM:, PS:, SM: or SS:
[ID line 2]
[.....]
[ID line m]
[name of.DAT file in \CONFIG\DAT]
]
Example:
;number of CD-ROM configurations
5
; All Sanyo 6 speed configs
; This CD-ROM requires a different driver line for SS, SM.....Therefore 4 configs with
each 1 ID line
;number of ID lines config 1.
1
; ID line
PM: SANYO S1G
;.DAT filename
SNYO61PM.DAT
1
PS: SANYO SIG
SNYO61PS.DAT
1
SM: SANYO SIG
SNYO61SM.DAT
1
SS: SANYO S1G
SNYO61SS.DAT
; All Mitsumi 4 speed configurations
; This CD-ROM requires 1 driver line for all configurations, therefore 1 config, with 4
ID
4
PM: XE 000E
PS: XE 000E
SM: XE000E
SS: XE000E
MITSUMI4.DAT
End example
First, list all the IDE configurations, first one being the fastest (or best), last one being the slowest one, after that list all the SCSI configurations.
The ID string of a CD-ROM can be obtained by running the program ATAPI3.EXE.
For IDE CD-ROM's add SM:[space][ID], SS:[space] [ID], etc. . . .
[cdrom].dat file (in \config\dat directory on boot disk)
Structure:
[number of config lines in CONFIG.SYS (=n)]
$0<=n<=5$
[CONFIG.SYS line 1]
Use [PATH] to indicate the path.
[....]
[CONFIG.SYS line n]
[number of config lines in AUTOEXEC.BAT (=m)]
$0<=n<=5$
[AUTOEXEC.BAT line 1]
Use [PATH] to indicate the path, use [DRIVELETTER] to indicate the drive letter.
[....]
[AUTOEXEC.BAT line m]
[number of files to be copied (=p)]
$0<=p<=5$
[....]

```
[filename 1]
[filename p]
[number of config lines in WFW SYSTEM.INI (=q)]
0<=q<=5
[
   [section name]
   [find in section]
   [replace found with]
]
[BOOLEAN OS installation possible with this model]
TRUE or FALSE
[BOOLEAN Driver installation possible with this model]
TRUE or FALSE (normally always TRUE)
Example:
;
FILENAME: MITSUMI4.DAT
;
;Number of config lines in config.sys
1
;config lines in config.sys
DEVICEHIGH=[PATH]MTMCDAI.SYS /D:CD1 /M: 10
;Number of config lines in autoexec.bat
1
;config lines in autoexec. bat
[PATH]MSCDEX.EXE \D:CD1 /L: [DRIVELETTER]
;Number of drivers to be copied/erased
3
;Drivers to be copied/erased
MTMCDAI.SYS
MTMCDAI.386
MSCDEX.EXE
;Number of config lines in windows system.ini
1
;section
;find
;replace
[386Enh]
mtmcdai.386
device=c:\cdrom\mtmcdai.386
;OS install possible with this CD-ROM?
TRUE
;Driver install possible with this CD-ROM?
TRUE
End example
cdrom.[language] file (in \config\[language] directory on
boot disk)
In case a CD-ROM is added which can not be auto-detected,
an entry has to be added to this file.
Structure:
[number of CD-ROM configurations (=n)]
0<=n<=30
[
   [name of configuration 1 to appear in the selection list]
   Length name >=1 AND <=60
   [.DAT filename]
]
Example:
;
; FILENAME: CDROM.ENG
; CONTAINS:—THE ENGLISH NAMES FOR THE DIF-
FERENT CDROMS
; —THE NAME OF THE FILE CONTAINING THE DATA
; Last line is special, must always be last line. If this option
is selected, the program switches
; to a list with all CD-ROM models in it (CDROMEXT.
[LANGUAGE]
;
This file contains CD-ROM's which are not auto-detected,
and therefore are a logical choice.
; CDROMEXT contains all the CD-ROM's, and is used in
case auto detection went wrong.
;Number of CD-ROM's
3
;Name of CD-ROM
;Name data file
SOLO 2 SPEED CD-ROM INTERNAL (PORTABLES
ONLY)
SOLO22.DAT
NO GATEWAY 2000 BOUGHT, OR NO CD-ROM
INSTALLED
NOCDROM.DAT
; Next line always has to be last.
; The filename SPECIAL.DAT is just a dummy name, not
physically present on disc
DISPLAY EXTENDED CD-ROM LIST
SPECIAL.DAT
End example.
Whenever a CD-ROM is added to this list, there help on this
CD-ROM has to be provided too. Help file which has to be
modified:
\CONFIG\LANGUAGE\CDROMHLP.[LANGUAGE],
which is a plain text file, each line of it should NOT exceed
column 73.
cdromext.[language] file (in \config\[language] directory on
boot disk)
When a CD-ROM is added which can be auto detected, an
entry has to be added to this list.
Example:
;
; FILENAME CDROMEXT.ALL
;
; Structure the same as 1.3 CDROM.[LANGUAGE]
;
; Displayed when last option in CDROM.[LANGUAGE] is
chosen.
; Again, the last line here is special, and must always be last.
When this option is chosen, the list
; CDROM.[LANGUAGE] is displayed.
;
; This file contains ALL the CD-ROM configuration
possibilities, except the ones listed in
; CDROM.[LANGUAGE].
; Number of different configurations
17
; Name to appear in list
; .DAT file in \CONFIG\DAT for that specific model
TOSHIBA 8 SPEED IDE
TOSHIBA8.DAT
WEARNES 8 SPEED IDE
WEARNES8.DAT
SANYO 4/6 SPEED 1 DECK IDE (SECONDARY
MASTER, DEFAULT)
SNYO61SM.DAT
SANYO 4/6 SPEED 1 DECK IDE (SECONDARY SLAVE)
SNYO61SS.DAT
SANYO 4/6 SPEED 1 DECK IDE (PRIMARY SLAVE)
SNYO61PS.DAT
SANYO 4/6 SPEED 1 DECK IDE (PRIMARY MASTER)
SNYO61PM.DAT
TOSHIBA 4 SPEED SCSI
TOSHIBA4.DAT
SANYO 4 SPEED 3 DECK IDE (SECONDARY MASTER,
DEFAULT)
```

SNYO43SM.DAT
SANYO 4 SPEED 3 DECK IDE (SECONDARY SLAVE)
SNYO43SS.DAT
SANYO 4 SPEED 3 DECK IDE (PRIMARY SLAVE)
SNYO43PS.DAT
SANYO 4 SPEED 3 DECK IDE (PRIMARY MASTER)
SNYO43PM.DAT
MITSUMI 4 SPEED IDE
MITSUMI4.DAT
NEC 2 SPEED IDE (SECONDARY MASTER, DEFAULT)
NEC2SM.DAT
NEC 2 SPEED IDE (SECONDARY SLAVE)
NEC2SS.DAT
NEC 2 SPEED IDE (PRIMARY SLAVE)
NEC2PS.DAT
NEC 2 SPEED IDE (PRIMARY MASTER)
NEC2PM.DAT
SPECIAL ONE. HAS TO BE LAST !!!!
;
DISPLAY SHORTENED LIST
SPECIAL.DAT
End example.
keybdata.[[language] file (in \config\[language] directory on boot disk)
Structure:
[number of keyboards (=n)]
0<=n<=30
[
[name of keyboard to appear in selection list]
Length name >=1 AND <=60
[DOS KEYB command]
]
Example:
;
FILENAME: KEYBDATA.ENG
; CONTAINS:—NAME OF THE KEYBOARD IN ENGLISH
; —DOS KEYB COMMAND
;Number of keyboards
5
; Name of keyboard
; Keyboard command
ENGLISH (UK) KEYBOARD
KEYB UK
ENGLISH (US) KEYBOARD
KEYB US
GERMAN KEYBOARD
KEYB GR
FRENCH KEYBOARD
KEYB FR
SWEDISH KEYBOARD
KEYB SW
End example
Help for the new entry should be implemented in the file:
\CONFIG[\LANGUAGE]\KEYBOARD. [LANGUAGE].
lselect.all file (in \config\all directory on boot disk)
Structure:
[number of languages (=n)]
(1<=n<=10)
[
  [extension and directory name of that language]
  Length >=1 AND <=3, for consistency =3
  [name of the language in that language]
  Length >=1 AND <=30
  [line to be displayed]
  Length >=1 AND <=78
]
Example:
;
; FILENAME: LSELECT.ALL
 DISPLAY: WHEN SELECTING A LANGUAGE
;
; Number of languages
5
; File extension of the language.
; Name of the language in that language
; Phrase to display during language selection.
ENG
ENGLISH
Press function key %F1% to use the %ENGLISH% language.
DUT
NEDERLANDS
Druk op functietoets %F2% om de %NEDERLANDSE% taal te gebruiken.
GER
DEUTSCH
Dr ck auf Funktionstaste %F3%, um die %DEUTSCHE% Sprache zu verwenden.
FRE
FRAN AIS
Appuyez sur la touche de fonction %F4% pour utiliser la langue %FRAN AISE%.
SWE
SVENSKA
Tryck p† funktionstangent %F5% f'r att anv„nda det %SVENSKA% spr†ket.
End example
langok.all and langnok.all files (in \config\all directory on boot disk)
Text files, in which an entry should be added for the new language which says LANGUAGENAME OK in LANGOK.ALL or OTHER LANGUAGE in LANGNOK.ALL
Example:
;
; FILENAME: LANGNOK.ALL;
; DISPLAY: AFTER SELECTING A LANGUAGE
%F1% %Other% language, %Andere% taal, %Autre% langue, %Andere% Sprache.
*
    %Andra% spr†k
End example.
Help Files
All the files in the directory \CONFIG\[LANGUAGE]\*.
[LANGUAGE] must be translated. The English files are the masters from which the translation shall be done.
Overview of the filenames to be translated (without extension):
LANGUAGE: Contains all the individual used phrases.
CDROMDET: Info displayed before CD-ROM is auto detected
CDROMHLP: Help displayed before user must select CD-ROM manually
DEWRITEP: Info displayed when a user has to remove write protection
FDISK: Info displayed before partitioning a hard drive
FORMAT: Info displayed before formatting a hard drive
INSTCDR: Info displayed before installing CD-ROM drivers on hard drive
INSTOS: Info displayed before installing OS on hard drive
KEYBDATA: File containing keyboard data (see installing a new keyboard)

KEYBOARD: Help displayed before selecting keyboard
CDROM: File containing CD-ROM data (see installing new CD-ROM)
MAINHELP: Help displayed when choosing help in main menu
MENU: File containing menu lines.
REBOOT: Info displayed before rebooting system
RESET: Info displayed before resetting bootdisk settings
WELCOME: Info displayed after selecting and confirming language
WRITEP: Info displayed when a user has to set write protection
CDERROR: Info displayed when an error occurred reading a CD-ROM
CDROMEXT: File containing extended CD-ROM list.

It is best to use a DOS editor (EDIT.EXE). Each file contains a header with information. Lines to appear blank in program are represented by an asterisk (*). Lines in language file starting with a semi-colon (;) or blank lines are ignored by the program. Color switch is indicated by the percentage symbol (%), an ASCII value is represented by the hash (#) symbol.

Examples:
;This line is ignored.
Press %F1% to %CONTINUE%. %#143% Swedish #143
; F1 and CONTINUE in black, Swedish A-ring in black, Swedish A-ring normal color.

Conclusion

As has been described herein, the boot disk program of the present invention provides for a number of advantages. The boot disk is universal. All of the necessary files and configuration information for a number of different keyboards, languages, and CD-ROM devices are all contained on the boot disk. Therefore, the boot disk can be used with any of a number of different computers; a separate boot disk for each unique combination of language/keyboard/CD-ROM device is not required. Furthermore, the boot disk is easy to use and informative. The user does not have to know the specific type of CD-ROM player that is installed on the user's computer. The boot disk program further asks the user in easy-to-understand terms for desired keyboard and language choices.

Those of ordinary skill in the art will readily appreciate that many changes and modifications to the above drawings and description can be made without departure from the spirit or scope of the following claims. For example, the boot disk program has been shown to largely apply to a computer running MS-DOS. However, modification of the present invention to apply to a computer running a different operating system is within the scope of the following claims.

I claim:

1. A computer system comprising:
   a computer having at least a central-processing unit, a memory, and a configuration file;
   a CD-ROM device;
   a flag register;
   a removable media storage device operatively coupled to the computer;
   a boot media removably insertable in the removable media storage device and having an executable program stored thereon for automatically detecting one of a plurality of different compact-disc read-only-memory (CD-ROM) devices, querying a user of the computer for a desired language in which for the computer to convey user-readable information, and causing installation of a driver program corresponding to the detected CD-ROM device, according to a method comprising:
   checking for the presence of a flag in the flag register denoting the presence of a CD-ROM device;
   detecting the CD-ROM;
   writing a flag as a function of the CD-ROM detected; and
   modifying the configuration file to reflect the CD-ROM device detected.

2. The computer system of claim 1, wherein the executable program further queries a user of the computer for a type of keyboard with which the computer will be used.

3. The computer system of claim 1, wherein the executable program further permits manual selection of the CD-ROM device by a user of the computer upon failure of automatic detection.

4. The computer system of claim 1, wherein the removable media storage device is a floppy disk drive and the boot media is a floppy disk.

5. A boot disk for a computer operatively coupled to a compact-disc read-only-memory (CD-ROM) device of a particular type, the boot disk having an executable program stored thereon comprising:
   a language selection component to query a user of the computer for a desired language in which for the computer to convey user-readable information;
   a keyboard selection component to query the user for a type of keyboard with which the computer will be used;
   a CD-ROM auto-selection component to detect automatically, and identify automatically, the particular type of the CD-ROM device operatively coupled to the computer, wherein the auto-selection component:
   checks for the presence of a flag in a flag register denoting the presence of the
   CD-ROM device,
   detects the CD-ROM,
   writes a flag as a function of the CD-ROM detected, and
   modifies the configuration file to reflect the CD-ROM device detected; and
   an installation component to cause installation of a CD-ROM driver program corresponding to the particular type of the CD-ROM device from the boot disk onto a storage device of the computer.

6. The boot disk of claim 5, further comprising a component to cause installation of an operating system onto a storage device of the computer.

7. The boot disk of claim 5, further comprising a component to reset the desired language selected by the user within the language selection component, reset the type of keyboard selected by the user within the keyboard selection component, and reset the particular type of CD-ROM automatically detected by the CD-ROM auto-selection component.

8. The boot disk of claim 5, wherein the keyboard selection component also displays on a display device of the computer user-readable information regarding selection of the keyboard with which the computer will be used.

9. The boot disk of claim 5, wherein the CD-ROM auto-selection component also displays on a display device of the computer user-readable information regarding detection of the particular type of the CD-ROM device operatively coupled to the computer.

10. The boot disk of claim 5, wherein the CD-ROM auto-selection component permits manual selection of the particular type of the CD-ROM device by the user of the computer upon failure of automatic detection of the particular type.

11. The boot disk of claim 5, wherein the CD-ROM device is one of the group of CD-ROM devices consisting of: an NEC two-speed CD-ROM device, a Mitsumi four-speed CD-ROM device, a Sanyo four-speed CD-ROM device, a Sanyo four-speed three-deck CD-ROM device, a Sanyo six-speed CD-ROM device, a Wearnes eight-speed CD-ROM device, a Toshiba eight-speed CD-ROM device, a Toshiba four-speed SCSI CD-ROM device, and a Gateway Solo CD-ROM device.

12. The boot disk of claim 5, wherein the desired language is one of the group of languages consisting of: English, Dutch (Benelux), German, French and Swedish.

13. The boot disk of claim 5, wherein the boot disk is a floppy disk.

14. The boot disk of claim 8, wherein the user-readable information includes keyboard navigation help information.

15. The boot disk of claim 9, wherein the user-readable information includes the particular type of the CD-ROM device operatively coupled to the computer.

16. A boot disk for a computer operatively coupled to a compact-disc read-only-memory (CD-ROM) device of a particular type, the boot disk comprising:

means for selecting a language in which for the computer to convey user-readable information to a user of the computer;

means for selecting a particular type of keyboard with which the computer will be used; and, means for automatically detecting and automatically identifying the particular type of the CD-ROM device.

17. A method for booting a computer operatively coupled to a compact-disc read-only-memory (CD-ROM) device of a particular type, the method comprising the steps of:

querying a user for a desired language in which for the computer to convey user-readable information;

querying the user for a type of keyboard with which the computer will be used;

automatically detecting and automatically identifying the particular type of the CD-ROM device operatively coupled to the computer, wherein the detecting and identifying step further comprise:

checking for the presence of a flag in a flag register denoting the presence of the CD-ROM device, detecting the CD-ROM, writing a flag as a function of the CD-ROM detected, and modifying a configuration file to reflect the CD-ROM detected; and causing installation of a corresponding driver program for the particular type of the CD-ROM device detected onto a storage device of the computer from the boot disk.

18. The method of claim 17, further comprising the step of querying a user for the particular type of the CD-ROM device operatively coupled to the computer upon failure of the step of automatically detecting the particular type.

* * * * *